US 9,426,855 B2
Aug. 23, 2016

(12) United States Patent
Lee et al.

(10) Patent No.: US 9,426,855 B2
(45) Date of Patent: Aug. 23, 2016

(54) MULTI-STAGE LED LIGHTING SYSTEMS

(71) Applicant: AMERICAN BRIGHT LIGHTING, INC., Chino, CA (US)

(72) Inventors: George Lee, Rowland Heights, CA (US); Stanley Chen, San Gabriel, CA (US)

(73) Assignee: AMERICAN BRIGHT LIGHTING, INC., Chino, CA (US)

( * ) Notice: Subject to any disclaimer, the term of this patent is extended or adjusted under 35 U.S.C. 154(b) by 31 days.

(21) Appl. No.: 14/324,904

(22) Filed: Jul. 7, 2014

(65) Prior Publication Data
US 2015/0216006 A1 Jul. 30, 2015

Related U.S. Application Data

(60) Provisional application No. 61/932,981, filed on Jan. 29, 2014.

(51) Int. Cl.
*H05B 37/02* (2006.01)
*H05B 33/08* (2006.01)
(52) U.S. Cl.
CPC ........... *H05B 33/0824* (2013.01); *Y02B 20/348* (2013.01)
(58) Field of Classification Search
USPC .......... 315/200 R, 185 R, 192, 201, 205, 246, 315/250, 253, 291, 294, 295, 297, 307, 312
See application file for complete search history.

(56) References Cited

U.S. PATENT DOCUMENTS

| | | | |
|---|---|---|---|
| 7,239,087 B2 | 7/2007 | Ball | |
| 8,258,720 B2 | 9/2012 | Lee et al. | |
| 8,492,986 B2 | 7/2013 | Radermacher | |
| 8,633,650 B2 | 1/2014 | Sauerlaender | |
| 2011/0210678 A1 | 9/2011 | Grajcar | |
| 2011/0298393 A1* | 12/2011 | Chew | H05B 33/0821 315/294 |
| 2012/0049742 A1* | 3/2012 | Lee | H05B 33/0809 315/122 |

* cited by examiner

*Primary Examiner* — Thai Pham
*Assistant Examiner* — Jianzi Chen
(74) *Attorney, Agent, or Firm* — Innovation Capital Law Group, LLP; Vic Lin

(57) ABSTRACT

Multi-stage LED drivers and lighting systems are disclosed. The lighting system comprises a bridge rectifier receiving power from an AC power line source, two or more current limiting devices, and a string of LEDs having a corresponding number of LED lamps connected in electrical series. Each of the current limiting devices is coupled to and provides current to the corresponding LED. When the instantaneous voltage of the alternating current source is near zero volts, no significant current flows through the string of LEDs. As the instantaneous voltage from the bridge rectifier increases beyond the forward voltages of the LEDs in the string, the current limiting devices energize and provide current to the corresponding LEDs as well as the LEDs connected to the cathode of the corresponding LED. The equivalent circuits of the lighting system vary throughout the power cycle of the AC line power source.

20 Claims, 9 Drawing Sheets

MULTI-STAGE LED LIGHTING SYSTEMS

RELATED APPLICATION INFORMATION

The present application claims priority under 35 U.S.C. Section 119(e) to U.S. Provisional Patent Application Ser. No. 61/932,981 filed Jan. 29, 2014 entitled "MULTI-STRINGS LED DRIVER," the disclosure of which is incorporated herein by reference in its entirety.

BACKGROUND OF THE INVENTION

1. Field of the Invention

The present invention relates in general to electric lighting systems. More particularly, the invention is directed to light emitting diode ("LED") drivers and lighting systems.

2. Description of the Related Art

Lighting apparatuses having LEDs are becoming increasingly common as LEDs exhibit higher efficiencies and longer lifetimes as compared to conventional light sources. Some recent lighting apparatuses drive LED arrays from AC power sources. However, these lighting apparatuses may not exhibit optimal performance.

Accordingly, a need exists to improve AC driven LED drivers and lighting systems.

SUMMARY OF THE INVENTION

In the first aspect, an LED lighting system is disclosed. The LED lighting system comprises a bridge rectifier directly coupled to an AC line power source and providing a rectified signal, the AC line power source having a power cycle, and a string of LEDs comprising a first, second, and third set of LEDs, the cathodes of the first set of LEDs connected to the anodes of the second set of LEDs, the cathodes of the second set of LEDs connected to the anodes of the third set of LEDs, the cathodes of the third set of LEDs connected to the bridge rectifier. The LED lighting system further comprises a first current limiting device coupled directly to the bridge rectifier receiving the rectified signal from the bridge rectifier, the first current limiting device coupled directly to the anode of the first set of LEDs and configured to provide a first limited current to the first, second, and third set of LEDs during a first portion of the power cycle. The LED lighting system further comprises a second current limiting device coupled directly to the bridge rectifier receiving the rectified signal from the bridge rectifier, the second current limiting device coupled directly to the anode of the second set of LEDs and configured to provide a second limited current to the second and third set of LEDs during a second portion of the power cycle. The LED lighting system further comprises a third current limiting device coupled directly to the bridge rectifier receiving the rectified signal from the bridge rectifier, the third current limiting device coupled directly to the anode of the third set of LEDs and configured to provide a third limited current to the third set of LEDs during a third portion of the power cycle.

In a first preferred embodiment, during the first portion of the power cycle, the first set of LEDs receives the first limited current, the second set of LEDs receives the first and second limited currents, and the third set of LEDs receives the first, the second, and the third limited currents. During the second portion of the power cycle, the second set of LEDs preferably receives the second limited current, and the third set of LEDs preferably receives the second and the third limited currents. During the third portion of the power cycle, the third set of LEDs preferably receives the third limited current. The first set of LEDs preferably comprises two LEDs connected in parallel, the second set of LEDs preferably comprises four LEDs connected in parallel, and, the third set of LEDs preferably comprises four LEDs connected in parallel. The Total Harmonic Distortion of Current (THDi) for the LED lighting system is preferably less than 20%. The first, the second, and the third current limiting devices are preferably connected directly to the bridge rectifier without intermediate switches, and, the first, the second, and the third current limiting devices are preferably connected directly to the first, the second, and third sets of LEDs respectively without intermediate switches.

The first, the second, and the third current limiting devices preferably provide the first, the second, and the third limited currents based on the instantaneous voltage of the AC line power source. The AC line power source is preferably a 120 volt AC power source. The AC line power source is preferably a 240 volt AC power source.

In a second aspect, an LED lighting system is disclosed. The LED lighting system comprises a bridge rectifier directly coupled to the AC line power source and providing the rectified signal, the AC line power source having a power cycle, and a string of LEDs comprising a first, second, third, and fourth set of LEDs, the cathodes of the first set of LEDs connected to the anodes of the second set of LEDs, the cathodes of the second set of LEDs connected to the anodes of the third set of LEDs, the cathodes of the third set of LEDs connected to the anodes of the fourth set of LEDs, the cathodes of the fourth set of LEDs connected to the bridge rectifier. The LED lighting system further comprises a first current limiting device coupled directly to the bridge rectifier receiving the rectified signal from the bridge rectifier, the first current limiting device coupled directly to the anode of the first set of LEDs and configured to provide a first limited current to the first, second, third, and fourth set of LEDs during a first portion of the power cycle. The LED lighting system further comprises a second current limiting device coupled directly to the bridge rectifier receiving the rectified signal from the bridge rectifier, the second current limiting device coupled directly to the anode of the second set of LEDs and configured to provide a second limited current to the second, third, and fourth set of LEDs during a second portion of the power cycle. The LED lighting system further comprises a third current limiting device coupled directly to the bridge rectifier receiving the rectified signal from the bridge rectifier, the third current limiting device coupled directly to the anode of the third set of LEDs and configured to provide a third and fourth limited current to the third set of LEDs during a third portion of the power cycle. The LED lighting system further comprises a fourth current limiting device coupled directly to the bridge rectifier receiving the rectified signal from the bridge rectifier, the fourth current limiting device coupled directly to the anode of the fourth set of LEDs and configured to provide a fourth limited current to the fourth set of LEDs during a fourth portion of the power cycle.

In a second preferred embodiment, during the first portion of the power cycle, the first set of LEDs preferably receives the first limited current, the second set of LEDs preferably receives the first and second limited currents, the third set of LEDs preferably receives the first, the second, and the third limited currents, and the fourth set of LEDs preferably receives the first, the second, the third, and the fourth limited currents. During the second portion of the power cycle, the second set of LEDs preferably receives the second limited current, and the third set of LEDs preferably receives the second and the third limited currents, the fourth set of LEDs preferably receives the second, the third, and the fourth limited currents. During the third portion of the power cycle, the third set of LEDs preferably receives the third limited current, the fourth set of LEDs preferably receives the third and the fourth limited currents. During the fourth portion of the power cycle, the fourth set of LEDs preferably receives the fourth limited current. The first set of LEDs preferably comprises two LEDs connected in parallel, the second set of LEDs preferably comprises four LEDs connected in parallel, the third set of LEDs preferably comprises five LEDs connected in parallel, and the fourth set of LEDs preferably comprises six LEDs connected in parallel. The first, the second, the third current, and the fourth limiting devices are preferably connected directly to the bridge rectifier without intermediate switches, and, the first, the second, the third, and the fourth current limiting devices are preferably connected directly to the first, the second, the third, and the fourth sets of LEDs respectively without intermediate switches.

The first, the second, the third, and the fourth current limiting devices preferably provide the first, the second, the third, and the fourth limited currents based on the instantaneous voltage of the AC line power source. The AC line power source is preferably a 120 volt AC power source. The AC line power source is preferably a 240 volt AC power source.

The LED lighting system preferably further comprises a fifth set of LEDs, the cathodes of the fourth set of LEDs connected to the anodes of the fifth set of LEDs, the cathodes of the fifth set of LEDs connected to the bridge rectifier, and a fifth current limiting device coupled directly to the bridge rectifier receiving the rectified signal from the bridge rectifier, the fifth current limiting device coupled directly to the anode of the fifth set of LEDs and configured to provide a fifth limited current to the fifth set of LEDs during a fifth portion of the power cycle.

In a third aspect, an LED lighting system is disclosed. The LED lighting system comprises a power source providing a current and having an output voltage, and a first stage comprising a first current limiting device and a first set of LEDs, the first current limiting device coupled directly to the power source, the first current limiting device coupled directly to the anode of the first set of LEDs. The LED lighting system further comprises a second stage comprising a second current limiting device and a second set of LEDs, the second current limiting device coupled directly to the power source, the second current limiting device coupled directly to the anode of the second set of LEDs. The cathodes of the first set of LEDs is connected to the anodes of the second set of LEDs.

In a third preferred embodiment, the LED lighting system further comprises additional stages comprising additional current limiting devices and corresponding additional sets of LEDs, each of the additional current limiting devices coupled to the anodes of the corresponding set of LEDs, said each of the additional current limiting devices coupled directly to the power source. The first and second current limiting devices are preferably connected directly to the power source without switches, and the first and second current limited devices are preferably connected directly to the first and second sets of LEDs without switches. The first and second current limiting devices preferably provide the first and second limited currents based on the instantaneous voltage of the AC line power source.

These and other features and advantages of the invention will become more apparent with a description of preferred embodiments in reference to the associated drawings.

DETAILED DESCRIPTION OF THE PREFERRED EMBODIMENTS

Figure 1:
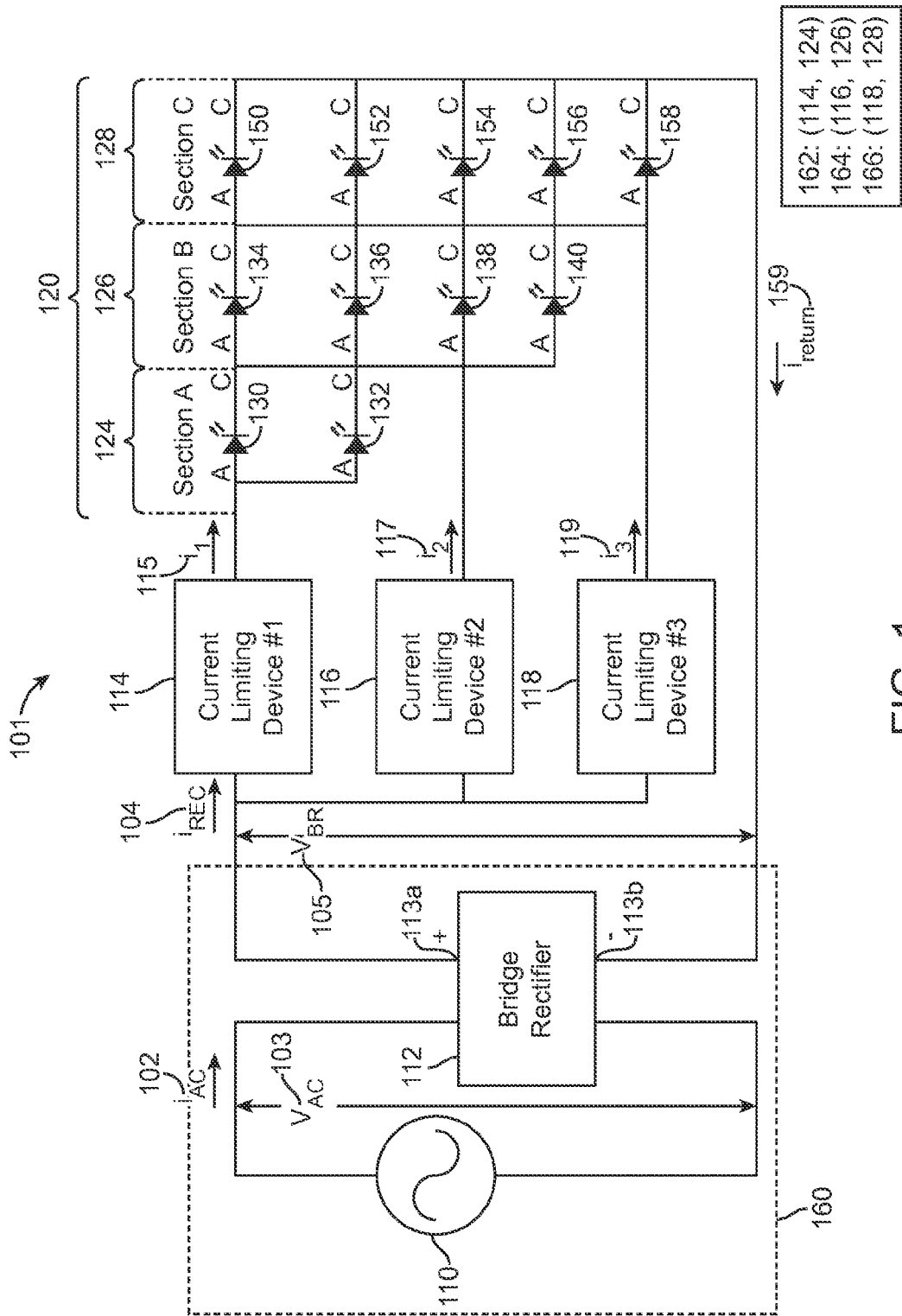
FIG. 1 shows an exemplary circuit diagram for a three stage LED lighting system in an embodiment.

The following preferred embodiments are directed to Light Emitting Diode ("LED") drivers and systems driven directly by Alternating Current ("AC") power sources. LEDs exhibit substantially greater power efficiencies and operating lifetimes as compared with conventional light sources such as incandescent lamps. However, several challenges exist for retrofitting LEDs and LED lamps into conventional 120 V/240 Volt alternating current ("AC") applications. Specifically, LEDs emit light when energized in a forward-biased configuration where the voltage across the LEDs meets or exceeds the forward voltage drop of the LED. One or more embodiments provide a lighting system for driving LEDs directly from AC power sources.

In one or more embodiments, the lighting system comprises a bridge rectifier receiving power from an AC power line source, two or more current limiting devices, and a string of LEDs having a corresponding number of LED lamps connected in electrical series. Each of the current limiting devices is coupled to and provides current to the corresponding LED. When the instantaneous voltage of the alternating current source is near zero volts, no significant current flows through the string of LEDs. As the instantaneous voltage from the bridge rectifier increases beyond the forward voltages of the LEDs in the string, the current limiting devices energize and provide current to the corresponding LEDs as well as the LEDs connected to the cathode of the corresponding LED. The equivalent circuits of the lighting system vary throughout the power cycle of the AC line power source which enable the system to exhibit a low total harmonic distortion of current and a higher duty cycle for illumination. The lighting system requires a low number of components which results in a lower bill of materials.

As used herein and as commonly known in the art, LEDs include semiconductor and organic (i.e. OLED) electroluminescent devices. LED lamps may refer to devices having multiple interconnected individual LEDs. Reference made herein to an LED or an LED lamp herein shall not be construed as being limited to an individual or multiple LEDs respectively. It shall be understood that terms LED and LED lamps may be interchangeable and that reference to an LED may also refer to an LED lamp, and reference to an LED lamp may also refer to an LED. Reference is made herein to 120 and 240 volt AC power sources. This also should not be taken as being limiting in nature as other power sources such as direct current sources and alternating current sources having other voltage and frequency ranges are contemplated in one or more embodiments. Reference made herein to bridge rectifiers shall not be taken as being limited in nature as other rectifiers such as full-wave rectifiers, half-wave rectifiers, three-phase rectifiers, three-phase half wave rectifiers, and other rectifiers or devices for converting alternating into direct current are contemplated in one or more embodiments. Reference made herein to current limiting devices may refer to circuit elements in which the current passing through the circuit element is essentially independent of the voltage across the circuit element. Current limiting devices may refer to active current sources, LED drivers, temperature compensated constant current LED drivers, transistor current sources, voltage regulator current sources, and other devices providing a constant current essentially independent of the voltage across the device for example.

FIG. 1 shows an exemplary circuit diagram for a three stage LED lighting system 101 in an embodiment. An AC line power source 110 generates an AC voltage $V_{AC}$ 103 and provides AC current $i_{AC}$ 102 to the bridge rectifier 112. The positive output 113a of the bridge rectifier 112 provides a full-wave rectified power signal having current $i_{REC}$ 104 and voltage $V_{BR}$ 105 to the current limiting devices 114, 116, and 118. A string of LEDs 120 has a first set of LEDs 124, a second set of LEDs 126, and a third set of LEDs 128. The cathodes (marked as "C" for the LEDs through this disclosure) of the first set of LEDs 124 is connected to the anodes (marked as "A" for the LEDs) of the second set of LEDs 126, the cathodes of the second set of LEDs 126 are connected to the anodes of the third set of LEDs 128. The cathodes of the third set of LEDs 128 are connected to the pin 113b of the bridge rectifier 112 and provide the return current $i_{RETURN}$ 159 to the bridge rectifier 112.

The first current limiting device 114 is coupled directly to the bridge rectifier 112 and receives a portion of the full-wave rectified signal current $i_{REC}$ 104 from the bridge rectifier 112. The first current limiting device 114 is coupled directly to the anode of the first set of LEDs 124 and is configured to provide a first limited current $i_1$ 115 to the first, second, and third set of LEDs 124, 126, and 128 when the voltage $V_{BR}$ 105 meets or exceeds the combined forward voltages of the first, second, and third sets of LEDs 124, 126, and 128.

The second current limiting device 116 is coupled directly to the bridge rectifier 112 and receives another portion of the full-wave rectified signal current $i_{REC}$ 104 from the bridge rectifier 112. The second current limiting device 116 is coupled directly to the anode of the second set of LEDs 126 and is configured to provide a second limited current $i_2$ 117 to the second and third set of LEDs 126 and 128 when the voltage $V_{BR}$ 105 meets or exceeds the combined forward voltages of the second and third sets of LEDs 126 and 128.

The third current limiting device 118 is coupled directly to the bridge rectifier 112 and receives another portion of the full-wave rectified signal current $i_{REC}$ 104 from the bridge rectifier 112. The third current limiting device 118 is coupled directly to the anode of the third set of LEDs 128 and is configured to provide a third limited current $i_3$ 119 to the third set of LEDs 128 when the voltage $V_{BR}$ 105 meets or exceeds the forward voltage of the third set of LEDs 128.

In one or more embodiments, the first, second, and third current limiting devices 114, 116, and 118 are connected directly to the bridge rectifier 112 without intermediate switches. In one or more embodiments, the first, second, and third current limiting devices 114, 116, and 118 are connected directly to the first, second, and third sets of LEDs 124, 126, and 128 respectively without intermediate switches. In one or more embodiments, the circuits do not include switches, digital devices, transformers, or transistors.

In one or more embodiments, the first, second, and third current limiting devices 114, 116, 118 provide the first, second, and third limited currents $i_1$ 115, $i_2$ 117, and $i_3$ 119 based on the instantaneous voltage $V_{AC}$ 103 of the AC line power source 110. In one or more embodiments, the first, second, and third current limiting devices 114, 116, 118 provide the first, second, and third limited currents $i_1$ 115, $i_2$ 117, and $i_3$ 119 based on the instantaneous voltage $V_{BR}$ 105 of the bridge rectifier 112.

In one or more embodiments, the first set of LEDs 124 is comprised of LEDs 130 and 132 connected in electrical parallel. The second set of LEDs 126 is comprised of LEDs 134, 136, 138, and 140 connected in parallel. A third set of LEDs 128 is comprised of LEDs 150, 152, 154, 156, and 158 connected in parallel.

In one or more embodiments, the AC line power source 110 is a 120 volt AC power source. In one or more embodiments, the AC line power source 110 is a 240 volt AC power source.

The circuit for the three stage LED lighting system 101 may also be viewed as a series of stacked stages energized by a power source 160 that provides a current and has an output voltage. The power source 160 may comprise the AC line power source 110 operated at 50/60 Hertz coupled to the bridge rectifier 112 in one or more embodiments. The power source 160 may comprise DC power sources or may comprise power sources which vary with time in one or more embodiments.

In an embodiment, a two-stage lighting system is contemplated having a first stage and a second stage. The first stage 162 comprises a first current limiting device 114 and a first set of LEDs 124 where the first current limiting device 114 is coupled directly to the power source 160. The first current limiting device 114 is also coupled directly to the anode of the first set of LEDs 124. The second stage 164 comprises a second current limiting device 116 and a second set of LEDs 126, where the second current limiting device 116 is coupled directly to the power source 160. The second current limiting device 116 is coupled directly to the anode of the second set of LEDs 126. The cathodes of the first set of LEDs 124 are connected to the anodes of the second set of LEDs 126.

Additional stages may be employed for other embodiments. Additional stages such as a third stage 166 comprising additional current limiting devices such as current limiting device 118 and corresponding additional sets of LEDs such as the third set of LEDs 128. Each of the additional current limiting devices such as current limiting device 118 is coupled to the anodes of the corresponding set of LEDs such as the third set of LEDs 128 where each of the additional current limiting devices such as current limiting device 118 is coupled directly to the power source 160.

Figure 2:
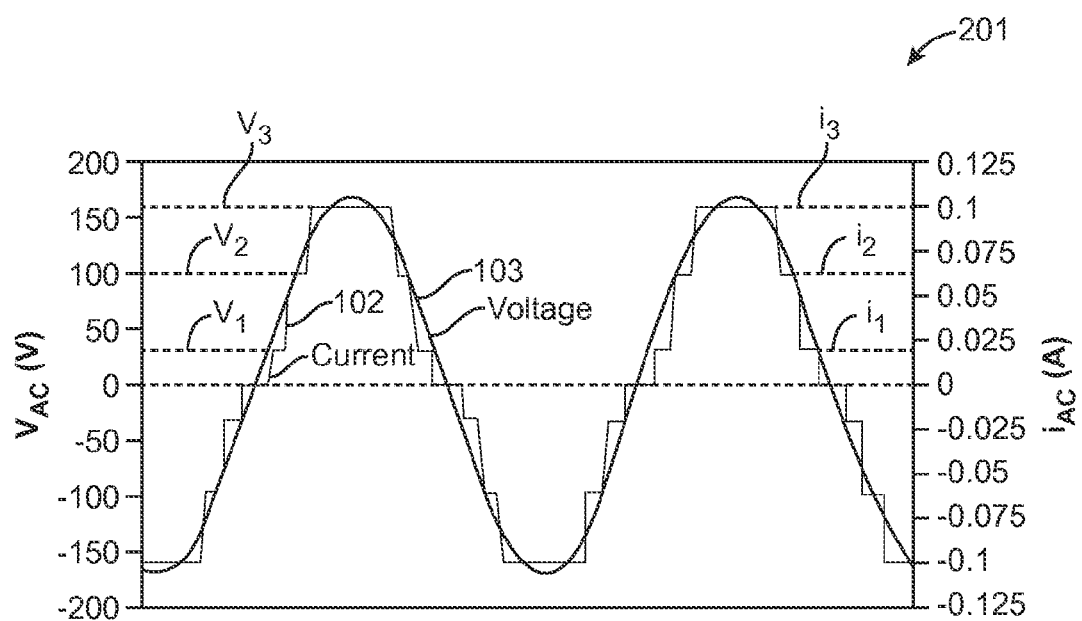
FIG. 2 depicts the voltage and current characteristics of the LED lighting system shown in FIG. 1.

FIG. 2 presents a measured trace 201 showing the temporal variation of the AC line voltage $V_{AC}$ 103 and the AC line current $i_{AC}$ 102 for a three stage LED lighting system 101. In this exemplary illustration, the first and second current limiting devices 114 and 116 are limited to a maximum current of 40 milliamperes, and the third current limiting device 118 is limited to the maximum current of 20 milliamperes. The AC line current $i_{AC}$ 102 exhibits a step-wise temporal dependence as described above with respect to FIG. 1. When the $V_{AC}$ 103 is between 0 volts and $V_1$, the current $i_{AC}$ 102 is approximately 0 milliamperes. When the $V_{AC}$ 103 is between $V_1$ and $V_2$, the current $i_{AC}$ 102 is approximately 20 milliamperes as represented by $i_1$, which is the current limit for the third current limiting device 118. When the $V_{AC}$ 103 is between $V_2$ and $V_3$, the current $i_{AC}$ 102 is approximately 60 milliamperes as represented by $i_2$, which is the sum of the current limits for the second and third current limiting devices 116 and 118. When the $V_{AC}$ 102 is equal to or above $V_3$, the current $i_{AC}$ 102 is approximately 100 milliamperes as represented by $i_3$, which is the sum of the current limits for the first, second, and third current limiting devices 114, 116, and 118. The measured total harmonic of distortion for current ("THDi") for this three stage LED lighting system 101 is less than 16.6%.

Figure 3:
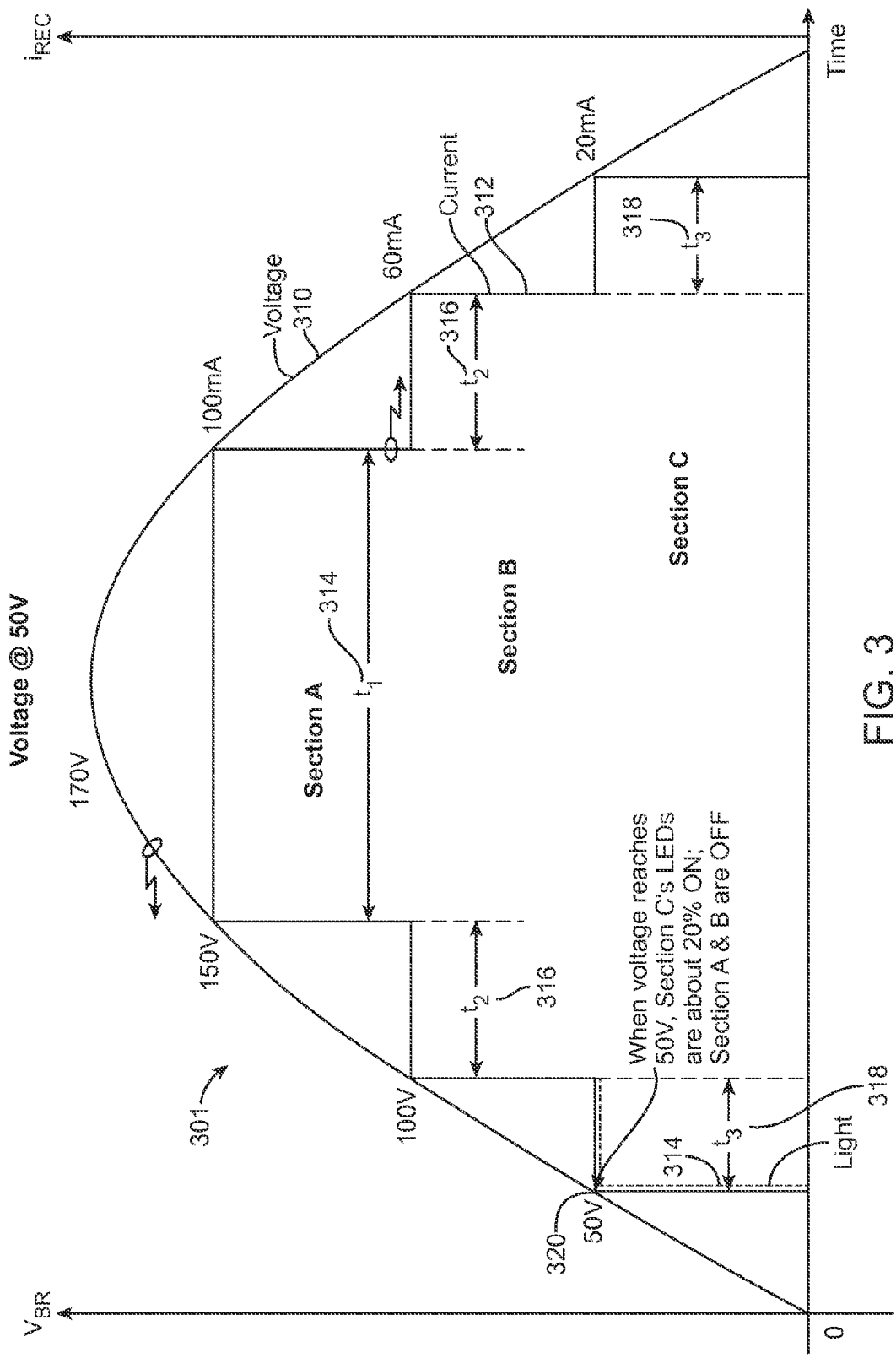
FIG. 3 is an exemplary graph of the voltage, current, and optical power for the embodiment depicted in FIG. 1 when the voltage reaches or exceeds 50 volts but is less than 100 volts.
Figure 4:
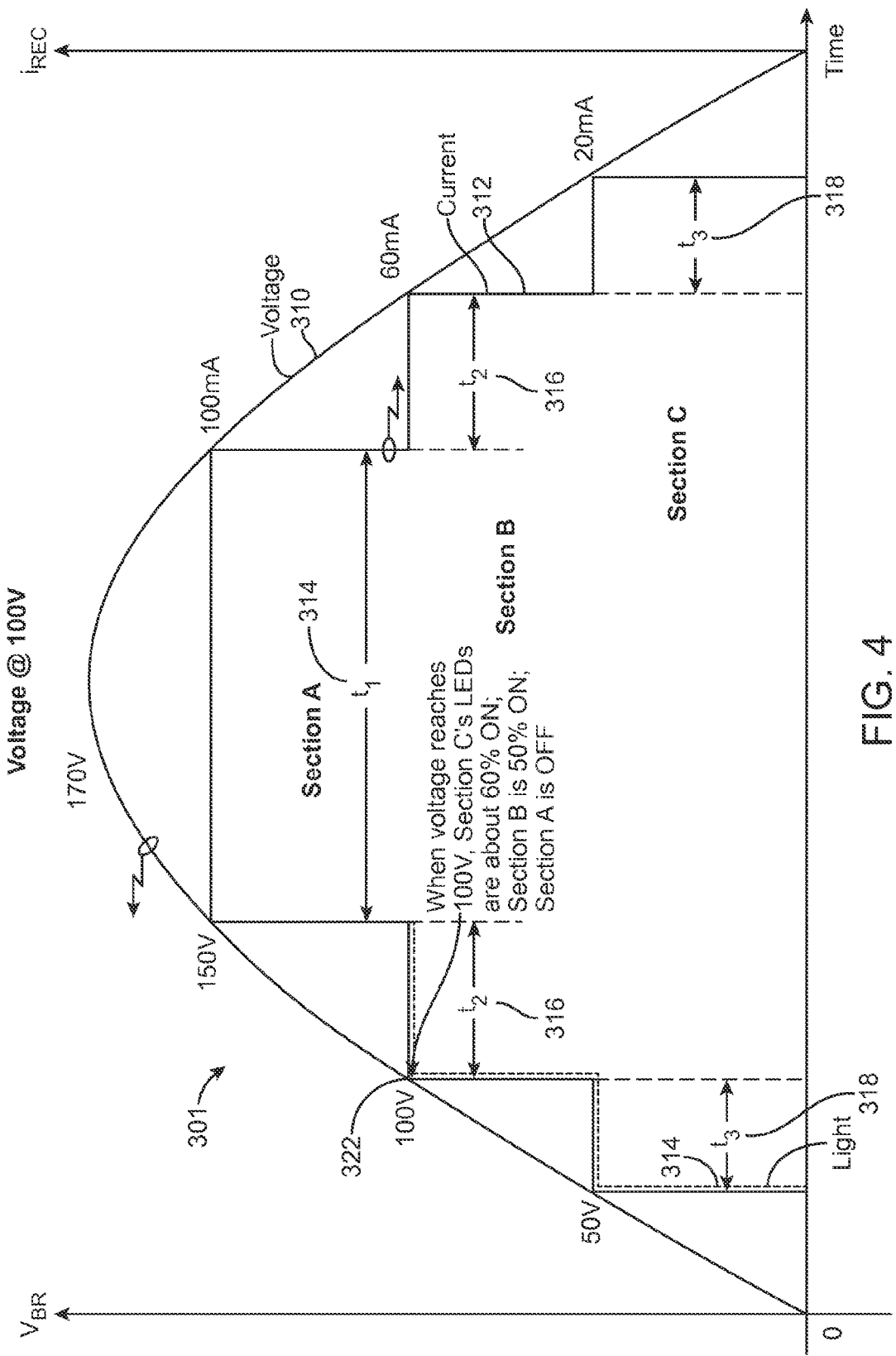
FIG. 4 is an exemplary graph of the voltage, current, and optical power for the embodiment depicted in FIG. 1 when the voltage reaches or exceeds 100 volts but is less than 150 volts.
Figure 5:
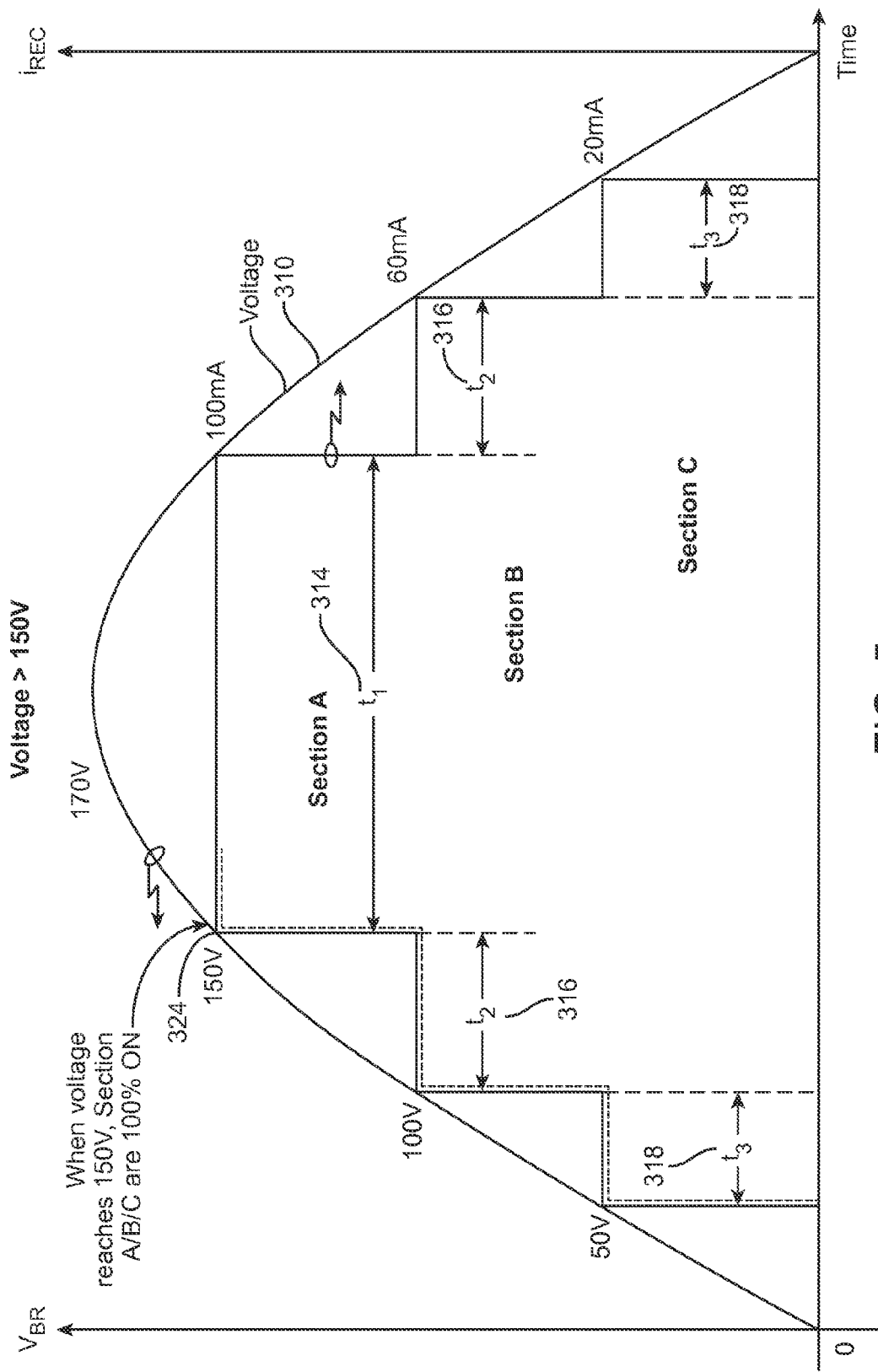
FIG. 5 is an exemplary graph of the voltage, current, and optical power for the embodiment depicted in FIG. 1 when the voltage reaches or exceeds 150 volts.

FIGS. 3-5 depict greater detail of the temporal variation of the current 312, voltage 310, and optical power 314 profiles. In an exemplary embodiment discussed below assumes that the LED lamps 130-158 have a forward voltage of 50 volts and a maximum current of 20 milliamperes, and that the first and second current limiting devices 114 and 116 each limit the current to 40 milliamperes. The third current limiting device 18 limits the current to 20 milliamperes in this example. It shall be understood that reference to specific devices are for demonstration purposes only as other LED lamps and other configurations for the current limiting devices 114, 116, and 118 are contemplated in one or more embodiments.

As shown in FIG. 3, when the $V_{BR}$ 105 is between 0 volts and the forward voltage for the third set of LEDs 128 (assuming in this example to be 50 volts), only small leakages currents flow through the set of LEDs 124, 126, and 128.

Referring to FIG. 3, as shown at point 320, when the voltage $V_{BR}$ 105 exceeds the forward voltage of the third set of LEDs 128, a total of 20 milliamperes will flow through the third set of LEDs 128 during this third time period $t_3$ 318. The third set of LEDs 128 comprises 5 LEDs of LEDs 150, 152, 154, 156, and 158. Hence, each of the third set of LEDs 128 will receive one-fifth of the 20 milliamperes or 4 milliamperes each. Assuming the maximum current for each LED of the third set of LEDs 128 is 20 milliamperes, each LED of the third set of LEDs 128 is operated at 4/20 or 20% of the maximum operating power. During this third portion $t_3$ 318 of the power cycle, the third set of LEDs 128 receives the third limited current $i_3$ 119, and the first and second sets of LEDs 124 and 126 will only generate negligible leakage currents.

Referring to FIG. 4, when the voltage $V_{BR}$ 105 exceeds the forward voltage of the second and third sets of LEDs 126 and 128 at point 322, the current $i_{REC}$ 104 will be 60 milliamperes during the second portion of the power cycle $t_2$ 316. During the second portion $t_2$ 316 of the power cycle, the second set of LEDs 126 receives the second limited current $i_2$ 117 of 40 milliamperes in this example, and the third set of LEDs 128 receives the second 117 and the third 119 limited currents $i_2+i_3$ or 20+40=60 milliamperes in this example. The second set of LEDs 126 comprises 4 LEDs (LEDs 134, 136, 138, and 140). Hence, each of the second set of LEDs 126 will receive one-fourth of the 40 milliamperes or 10 milliamperes for each. Assuming the maximum current for each LED of the second set of LEDs 126 is 20 milliamperes, each LED of the second set of LEDs 126 is operated at 10/20 or 50% of the maximum operating power. The third set of LEDs 128 has five LEDs, so each of the third set of LEDs 128 will receive one-fifth of the 60 milliamperes or 12 milliamperes each. Assuming the maximum current for each LED of the third set of LEDs 128 is 20 milliamperes, each LED of the third set of LEDs is operated at 12/20 or 60% of the maximum operating power.

Referring to FIG. 5, when the voltage $V_{BR}$ 105 exceeds the forward voltage of the first, second, and third sets of LEDs 124, 126, and 128 at point 324, the current $i_{REC}$ 104 will be 100 milliamperes during the first portion of the power cycle $t_1$ 314. During the first portion $t_1$ 314 of the power cycle, the first set of LEDs 124 receives the first limited current $i_1$ 115 which is 40 milliamperes in this example, the second set of LEDs 126 receives the first and second limited currents $i_1$ 115 and $i_2$ 117 which is 40+40=80 milliamperes in this example, and the third set of LEDs 128 receives the first, second, and third limited currents $i_1$ 115, $i_2$ 117, and $i_3$ 119 which is 40+40+20=100 milliamperes in this example.

The first set of LEDs 124 has two LEDs (LEDs 130 and 132), so each of the first set of LEDs 124 will receive one-half of the 40 milliamperes or 20 milliamperes each. Assuming the maximum current for each LED of the first set of LEDs 124 is 20 milliamperes, then each LED of the first set of LEDs 124 is operated at 20/20 or 100% of the maximum operating power.

The second set of LEDs 126 comprises 4 LEDs (LEDs 134, 136, 138, and 140). Hence, each of the second set of LEDs 126 will receive one-fourth of the 80 milliamperes or 20 milliamperes for each. Assuming the maximum current for each LED of the second set of LEDs 126 is 20 milliamperes, then each LED of the second set of LEDs 126 is operated at 20/20 or 100% of the maximum operating power.

The third set of LEDs 128 has five LEDs, so each of the third set of LEDs 128 will receive one-fifth of the 100 milliamperes or 20 milliamperes each. Assuming the maximum current for each LED of the third set of LEDs 128 is 20 milliamperes, then each LED of the third set of LEDs is operated at 20/20 or 100% of the maximum operating power.

Figure 6:
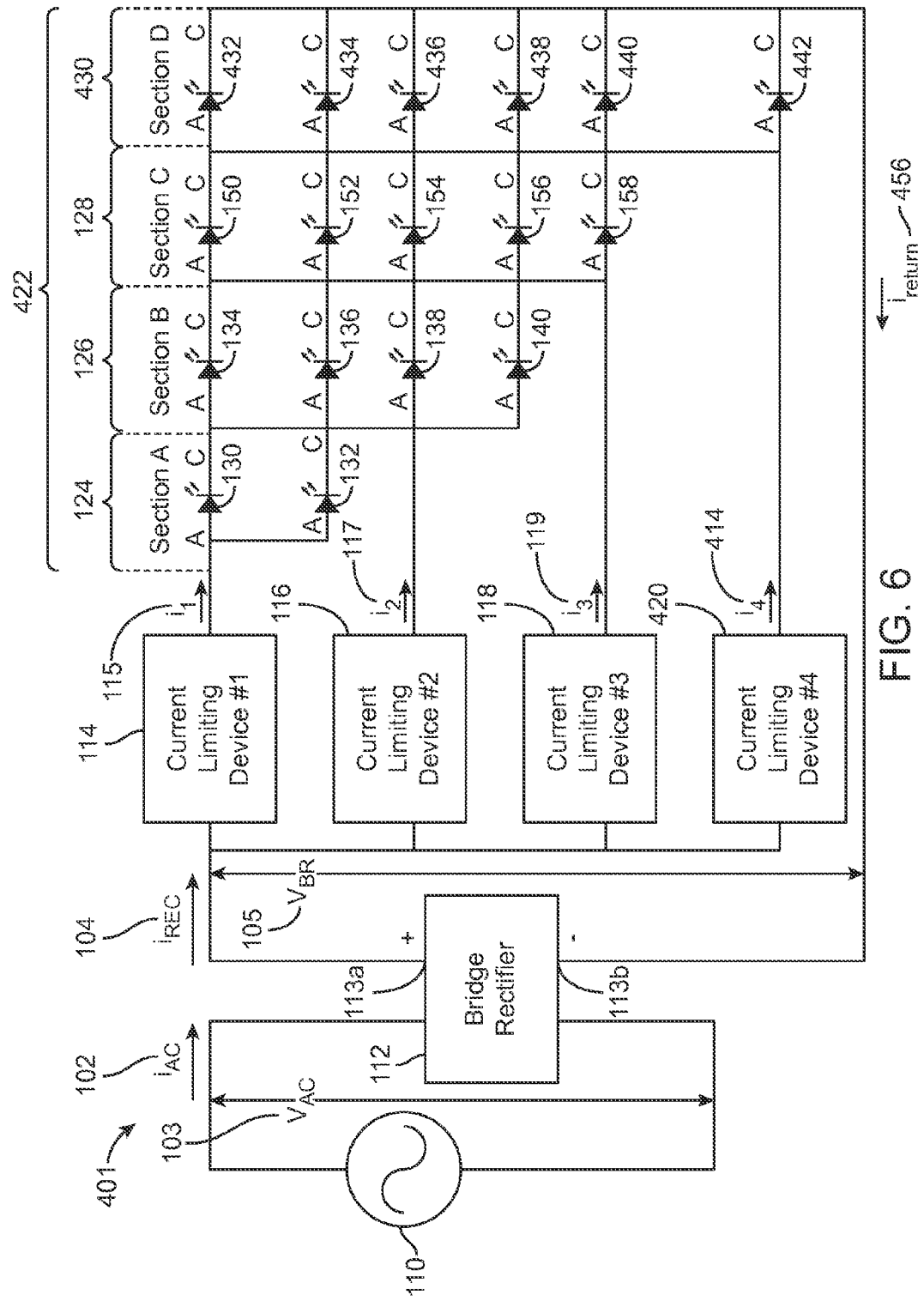
FIG. 6 shows an exemplary circuit diagram for a four stage LED lighting system in an embodiment.

FIG. 6 shows an exemplary circuit diagram for a four stage LED lighting system 401 in an embodiment. As discussed above, an AC line power source 110 generates an AC voltage $V_{AC}$ 103 and provides AC current $i_{AC}$ 102 to the bridge rectifier 112. The positive output 113a of the bridge rectifier 112 provides a full-wave rectified power signal having current $i_{REC}$ 104 and voltage $V_{BR}$ 105 to the current limiting devices 114, 116, 118, and 430. A string of LEDs 422 has a first set of LEDs 124, a second set of LEDs 126, a third set of LEDs 128, and a fourth set of LEDs 430.

The cathodes of the first set of LEDs 124 is connected to the anodes the second set of LEDs 126, the cathodes of the second set of LEDs 126 are connected to the anodes of the third set of LEDs 128. The cathodes of the third set of LEDs 128 are connected to anodes of the fourth set of LEDs 430, and the cathodes of the fourth set of LEDs 430 are connected to pin 113b of the bridge rectifier 112 and provide the return current $i_{RETURN}$ 456 to the bridge rectifier 112.

Figure 7:
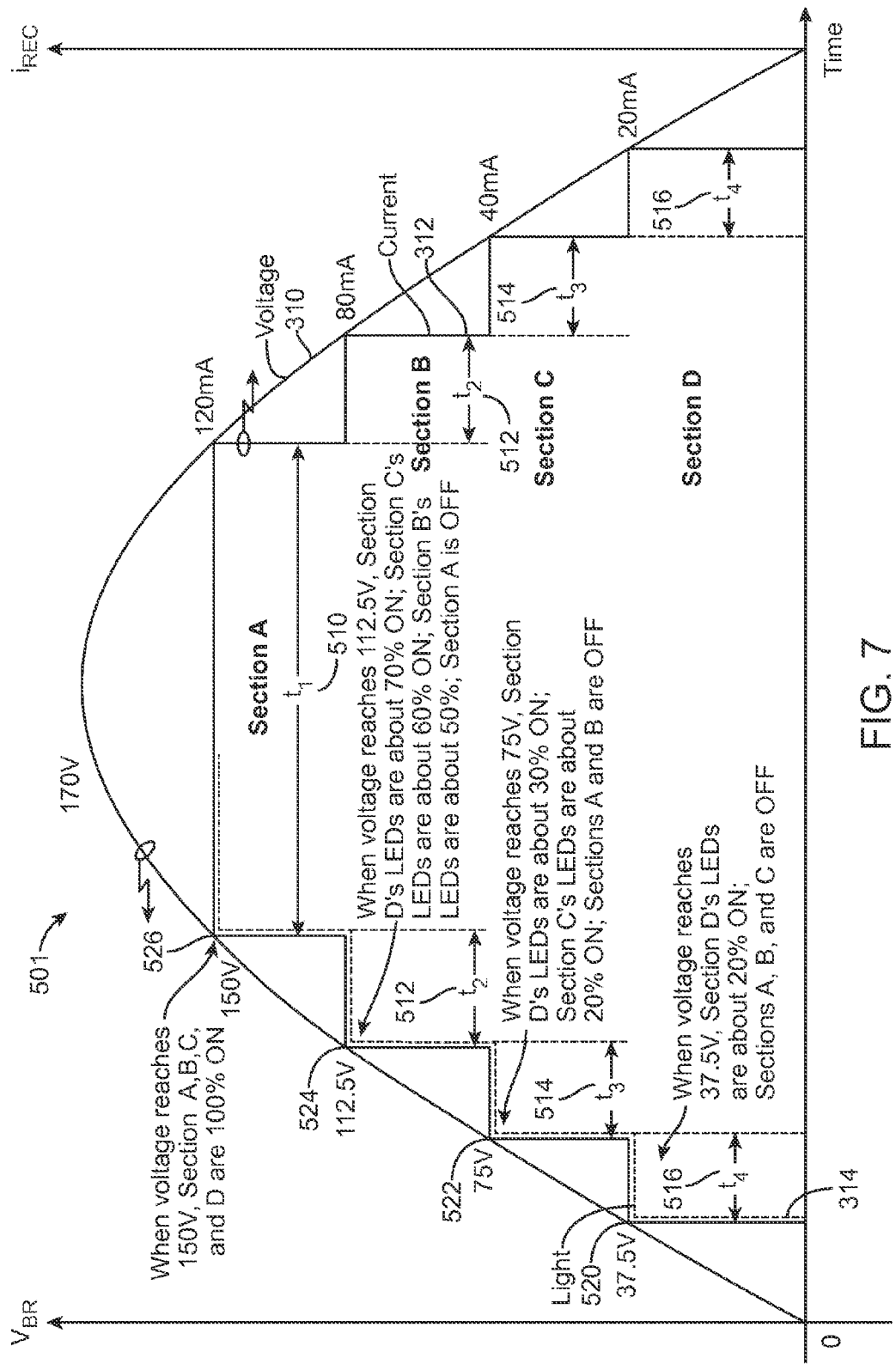
FIG. 7 is an exemplary graph of the voltage, current, and optical power for the embodiment depicted in FIG. 6.

The first current limiting device 114 is coupled directly to the anode of the first set of LEDs 124 and is configured to provide a first limited current $i_1$ 115 to the first, second, third, and fourth sets of LEDs 124, 126, 128, and 430 when the voltage $V_{BR}$ 105 meets or exceeds the combined forward voltages of the first, second, third, and fourth sets of LEDs 124, 126, 128, and 430 during a first portion of the power cycle $t_1$ 510 (shown in FIG. 7).

The second current limiting device 116 is coupled directly to the anode of the second set of LEDs 126 and is configured to provide a second limited current $i_2$ 117 to the second, third, and fourth sets of LEDs 126, 128, and 430 when the voltage $V_{BR}$ 105 meets or exceeds the combined forward voltages of the second, third, and fourth sets of LEDs 126, 128, and 430 during a second portion of the power cycle $t_2$ 512.

The third current limiting device 118 is coupled directly to the anode of the third set of LEDs 128 and is configured to provide a third limited current $i_3$ 119 to the third and fourth sets of LEDs 128 and 430 when the voltage $V_{BR}$ 105 meets or exceeds the combined forward voltages of the third and fourth sets of LEDs 128 and 430 during a third portion of the power cycle $t_3$ 514.

The fourth current limiting device 420 is coupled directly to the anode of the fourth set of LEDs 430 and is configured to provide a fourth limited current $i_4$ 414 to the fourth set of LEDs 430 when the voltage $V_{BR}$ 105 meets or exceeds the forward voltage of the fourth set of LEDs 430 during the fourth portion of the power cycle $t_4$ 516.

In one or more embodiments, the first, second, third, and fourth current limiting devices 114, 116, 118, and 430 are connected directly to the bridge rectifier 112 without intermediate switches. In one or more embodiments, the first, the second, the third, and the fourth current limiting devices 114, 116, 118, and 430 are connected directly to the first, the second, third, and fourth sets of LEDs 124, 126, 128, and 430 respectively without intermediate switches.

In one or more embodiments, the first, second, third, and fourth current limiting devices 114, 116, 118, and 430 provides the first, second, third, and fourth limited current $i_1$ 115, $i_2$ 117, $i_3$ 119 and $i_4$ 414 based on the instantaneous voltage $V_{AC}$ 103 of the AC line power source 110. The fourth set of LEDS 430 is comprised of LEDS 432, 434, 436, 438, 440, and 442 connected in electrical parallel.

FIG. 7 depicts greater detail of the temporal variation of the current, voltage, and optical power profiles during the power cycle. In an exemplary embodiment discussed below assumes that the LED lamps 130-158 and 432-442 have a forward voltage of 37.5 volts and a maximum current of 20 milliamperes. This exemplary embodiment also assumes that the first and second current limiting devices 114 and 116 each limit the current to 40 milliamperes and the third and fourth current limiting devices 118 and 420 each limit the current to 20 milliamperes. However, these values are for demonstration purposes as other LED lamps and other configurations for the current limiting devices 114, 116, 118, and 420 are contemplated in one or more embodiments.

When the $V_{BR}$ 105 is between 0 volts and the forward voltage for the fourth set of LEDs 430 (assuming in this example to be 37.5 volts), small leakage currents flow through the sets of LEDs 124, 126, 128, and 420 and the LEDs do not illuminate.

As shown at point 520, when the voltage $V_{BR}$ 105 exceeds the forward voltage of the fourth set of LEDs 430 during the fourth portion of the power cycle $t_4$ 516, the fourth set of LEDs 430 receives the fourth limited current $i_4$ 414. As shown, the fourth set of LEDs 430 are operating at approximately 20% of the maximum optical power, and the first, second, and third set of LEDs 124, 126, and 128 are not illuminating.

At point 522, when the voltage $V_{BR}$ 105 exceeds the forward voltage of the third and fourth sets of LEDs 128 and 430 during a third portion of the power cycle $t_3$ 514, the third set of LEDs 128 receives the third limited current $i_3$ 119, and the fourth set of LEDs 430 receives the third and the fourth limited currents $i_3$ 119 and $i_4$ 414. As shown, the fourth set of LEDs 430 is operating at approximately 30% of maximum, the third set of LEDs 128 is operating at approximately 20% of the maximum optical power, and the first and the second sets of LEDs 124 and 126 are not illuminating.

At point 524, when the voltage $V_{BR}$ 105 exceeds the forward voltage of the second, third, and fourth sets of LEDs 126, 128, and 430 during a second portion of the power cycle $t_2$ 512, the second set of LEDs 126 receives the second limited current $i_2$ 117, the third set of LEDs 128 receives the second and the third limited currents $i_2$ 117 and $i_3$ 119, and the fourth set of LEDs receives the second $i_2$ 117, the third $i_3$ 119, and the fourth limited currents $i_4$ 414. As shown, the fourth set of LEDs 430 is operating at approximately 70% of the maximum optical power, the third set of LEDs 128 is operating at approximately 60% of the maximum optical power, and the second set of LEDs 126 is operating at approximately 50% of the maximum optical power. The first set of LEDs 124 is not illuminating.

At point 526, when the voltage $V_{BR}$ 105 exceeds the forward voltage of the first, second, third and fourth sets of LEDs 124, 126, 128, and 430 during a first portion of the power cycle $t_1$ 510, the first set of LEDs 124 receives the first limited current $i_1$ 115. The second set of LEDs 126 receives the first and second limited currents $i_1$ 115 and $i_2$ 117. The third set of LEDs 128 receives the first, second, and third limited currents $i_1$ 115, $i_2$ 117 and $i_3$ 119. The fourth set of LEDs receives the first $i_1$ 115, the second $i_2$ 117, the third $i_3$ 119, and the fourth limited currents $i_4$ 414. As shown, the first, second, third, and fourth sets of LEDs 124, 126, 128, and 430 are operating at approximately 100% of maximum power.

Figure 8:
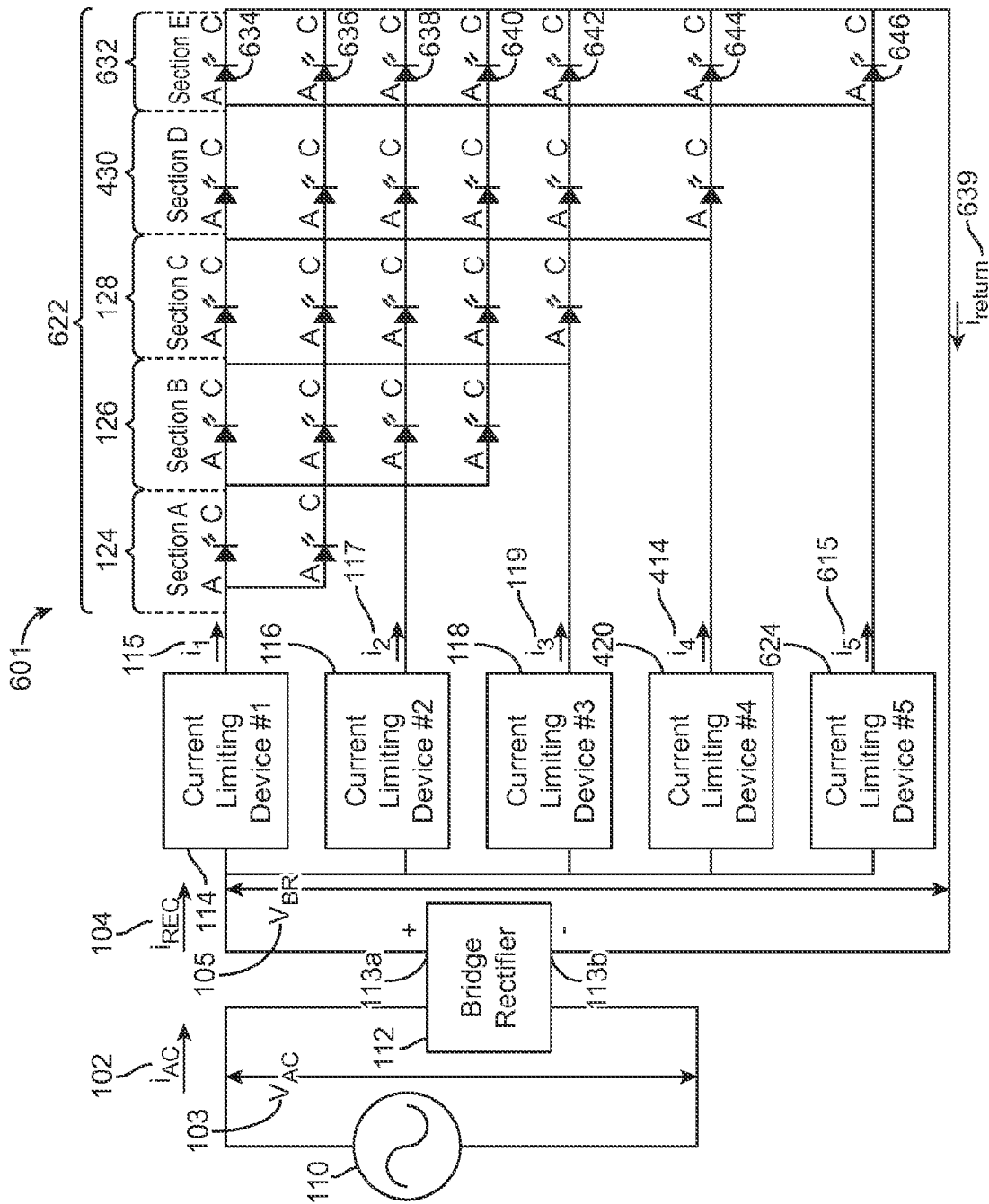
FIG. 8 shows an exemplary circuit diagram for a five stage LED lighting system in an embodiment.

FIG. 8 shows an exemplary circuit diagram for a five stage LED lighting system 601 in an embodiment. As discussed above, an AC line power source 110 generates an AC voltage $V_{AC}$ 103 provides AC current $i_{AC}$ 102 to the bridge rectifier 112. The positive output 113a of the bridge rectifier 112 provides a full-wave rectified power signal having current $i_{REC}$ 104 and voltage $V_{BR}$ 105 to the current limiting devices 114, 116, 118, 420, and 624. A string of LEDs 422 has a first set of LEDs 124, a second set of LEDs 126, a third set of LEDs 128, a fourth set of LEDs 430, and a fifth set of LEDs 632.

The cathodes of the first set of LEDs 124 are connected to the anodes the second set of LEDs 126, the cathodes of the second set of LEDs 126 are connected to the anodes of the third set of LEDs 128. The cathodes of the third set of LEDs 128 are connected to anodes of the fourth set of LEDs 430, and the cathodes of the fourth set of LEDs 430 are connected to the anodes of the fifth set of LEDs 632. The cathodes of the fifth set of LEDs 632 are connected to the pin 113b of the bridge rectifier 112 and provides the return current $i_{RETURN}$ 659 to the bridge rectifier 112.

Figure 9:
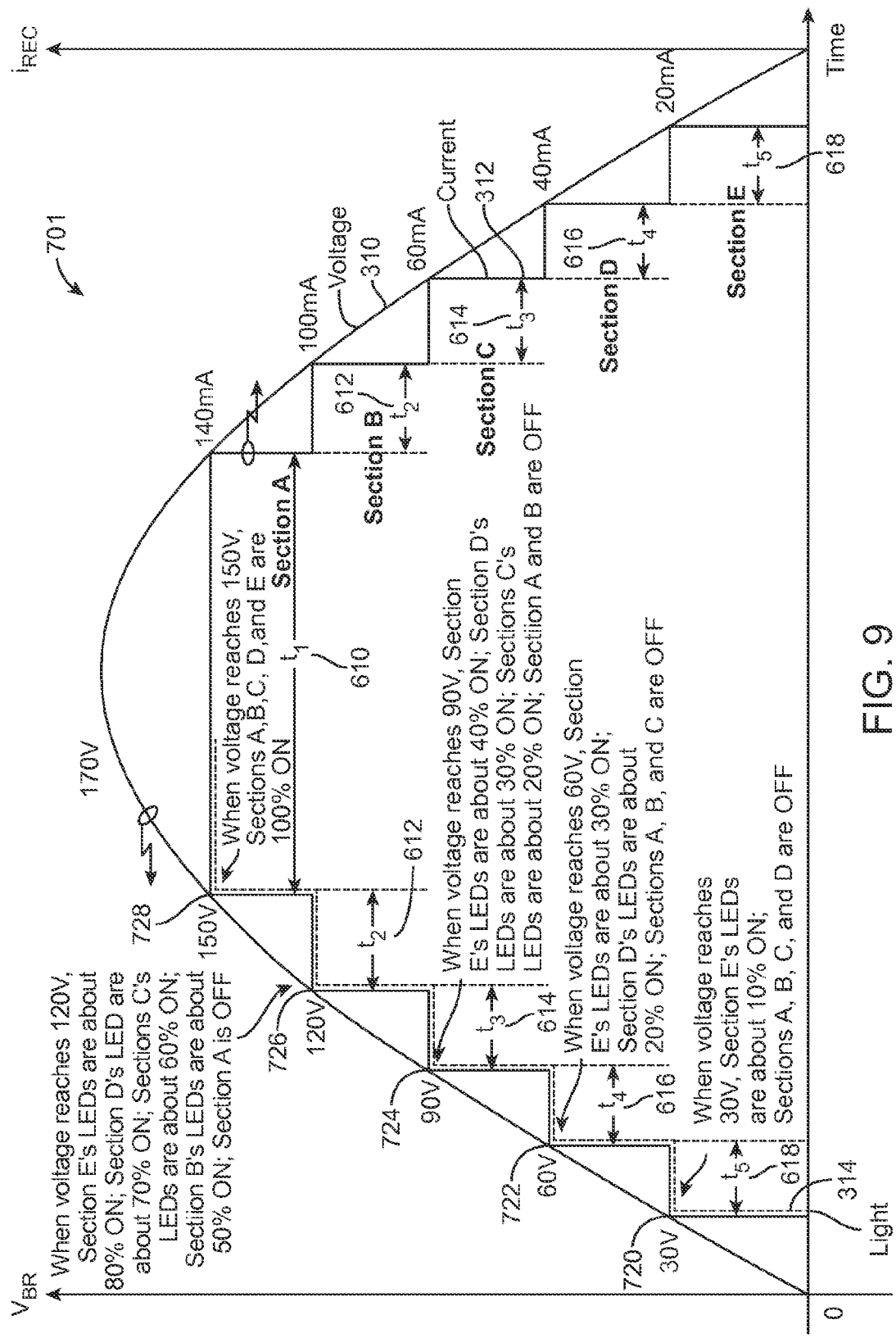
FIG. 9 is an exemplary graph of the voltage, current, and optical power for the embodiment depicted in FIG. 8.

The first current limiting device 114 is coupled directly to the anode of the first set of LEDs 124 and is configured to provide a first limited current $i_1$ 115 to the first, second, third, fourth, and fifth sets of LEDs 124, 126, 128, 430, and 632 when the voltage $V_{BR}$ 105 meets or exceeds the combined forward voltages of the first, second, third, fourth, and fifth sets of LEDs 124, 126, 128, 430, and 632 during a first portion of the power cycle $t_1$ 610 (shown in FIG. 9).

The second current limiting device 116 is coupled directly to the anode of the second set of LEDs 126 and is configured to provide a second limited current $i_2$ 117 to the second, third, fourth, and fifth sets of LEDs 126, 128, 430, and 632 when the voltage $V_{BR}$ 105 meets or exceeds the combined forward voltages of the second, third, fourth, and fifth sets of LEDs 126, 128, 430, 632 during a second portion of the power cycle $t_2$ 612.

The third current limiting device 118 is coupled directly to the anode of the third set of LEDs 128 and is configured to provide a third limited current $i_3$ 119 to the third, fourth, and fifth sets of LEDs 128, 430, and 632 when the voltage $V_{BR}$ 105 meets or exceeds the combined forward voltages of the third, fourth, and fifth sets of LEDs 128, 430, and 632.

The fourth current limiting device 420 is coupled directly to the anode of the fourth set of LEDs 430 and is configured to provide a fourth limited current $i_4$ 414 to the fourth and fifth sets of LEDs 430 and 632 when the voltage $V_{BR}$ 105 meets or exceeds the combined forward voltages of the fourth and fifth sets of LEDs 430 and 632.

The fifth current limiting device 624 is coupled directly to the bridge rectifier 112 and receives another portion of the full-wave rectified signal current $i_{REC}$ 104 from the bridge rectifier 112. The fifth current limiting device 632 is coupled directly to the anode of the fifth set of LEDs 632 and is configured to provide a fifth limited current $i_5$ 615 to the fifth set of LEDs 632 when the voltage $V_{BR}$ 105 meets or exceeds the forward voltage of the fifth set of LEDs 632.

In one or more embodiments, the first, second, third, fourth, and fifth current limiting devices 114, 116, 118, 430, and 632 are connected directly to the bridge rectifier 112 without intermediate switches. In one or more embodiments, the first, the second, the third, the fourth, and the fifth current limiting devices 114, 116, 118, 420, and 624 are connected directly to the first, the second, third, fourth, and fifth sets of LEDs 124, 126, 128, 430, and 632 respectively without intermediate switches.

In one or more embodiments, the first, second, third, fourth, and fifth current limiting devices 114, 116, 118, 420, and 624 provides the first, second, third, fourth, and fifth limited current $i_1$ 115, $i_2$ 117, $i_3$ 119, $i_4$ 414, and $i_5$ 615 based on the instantaneous voltage $V_{AC}$ 103 of the AC line power source 110. The fifth set of LEDs 632 is comprised of LEDS 634, 636, 638, 640, 642, 644, and 646 connected in electrical parallel.

FIG. 9 depicts greater detail of the temporal variation of the current 312, voltage 310, and optical power 314 profiles. In an exemplary embodiment discussed below assumes that the LED lamps 130-158, 432-442, and 634-646 have a forward voltage of 30 volts and a maximum current of 20 milliamperes, and that the first and second current limiting devices 114 and 116 each limit the current to 40 milliamperes and the third, fourth, and fifth current limiting devices 118, 420, and 624 limits the current to 20 milliamperes. However, these values are for demonstration purposes as other LED lamps and other configurations for the current limiting devices 114, 116, 118, 420, and 624 are contemplated in one or more embodiments.

When the $V_{BR}$ 105 is between 0 Volts and the forward voltage for the fifth set of LEDs 632 (assuming in this example to be 30 volts), small leakages currents flow through the set of LEDs 124, 126, 128, 430, and 632 and the LEDs will not illuminate.

As shown at point 720, when the voltage $V_{BR}$ 105 exceeds the forward voltage of the fifth set of LEDs 632 during the fifth portion of the power cycle $t_5$ 618, the fifth set of LEDs 632 receives the fifth limited current $i_5$ 615. As shown, the fifth set of LEDs 632 are operating at approximately 10% of the maximum optical power, and the first, second, third, and fourth sets of LEDs 124, 126, 128, 430 are not illuminating.

As shown at point 722, when the voltage $V_{BR}$ 105 exceeds the forward voltage of the fourth and fifth sets of LEDs 420 and 632 during the fourth portion of the power cycle $t_4$ 616, the fourth set of LEDs 420 receives the fourth limited current $i_4$ 414, and the fifth set of LEDS 632 receive the fourth and fifth limited currents $i_4$ 414 and $i_5$ 615. As shown, the fifth set of LEDs 632 are operating at approximately 30% of the maximum optical power, the fourth set of LEDs 430 are operating at approximately 20% the maximum optical power, and the first, second, and third set of LEDs 124, 126, and 128 are not illuminating.

At point 724, when the voltage $V_{BR}$ 105 exceeds the forward voltage of the third, fourth, and fifth sets of LEDs 128, 420, and 632 during a third portion of the power cycle $t_3$ 614, the third set of LEDs 128 receives the third limited current $i_3$ 119, the fourth set of LEDs 420 receives the third and the fourth limited currents $i_3$ 119 and $i_4$ 414, and the fifth set of LEDs 632 receives the third, fourth, and fifth limited currents $i_3$ 119, $i_4$ 414, and $i_5$ 615. As shown, the fifth set of LEDs 632 are operating at approximately 40% of maximum optical power, the fourth set of LEDs 430 are operating at approximately 30% of the maximum optical power, the third set of LEDs 420 are operating at approximately 20% of the maximum optical power, and the first and the second sets of LEDs 124 and 126 are not illuminating.

At point 726, when the voltage $V_{BR}$ 105 exceeds the forward voltage of the second, third, fourth, and fifth sets of LEDs 126, 128, 420, and 632 during a second portion of the power cycle $t_2$ 612. The second set of LEDs 126 receives the second limited current $i_2$ 117, the third set of LEDs 128 receives the second and the third limited currents i2 117 and $i_3$ 119, and the fourth set of LEDs receives the second $i_2$ 117, the third $i_3$ 119, and the fourth limited currents $i_4$ 414. The fifth set of LEDs 632 receives the second, third, fourth, and the fifth limited currents $i_2$ 117, $i_3$ 119, $i_4$ 414, and $i_5$ 615. As shown, the fifth set of LEDs 632 are operating at 80% of maximum optical power, the fourth set of LEDs 430 are operating at approximately 70% of maximum optical power, the third set of LEDs 128 are operating at approximately 60% of maximum optical power, the second set of LEDs 126 are operating at approximately 50% of maximum optical power and the first set of LEDs 124 is not illuminating.

At point 728, when the voltage $V_{BR}$ 105 exceeds the forward voltage of the first, second, third, fourth, and fifth sets of LEDs 124, 126, 128, 420, and 632 during a first portion of the power cycle $t_1$ 610, the first set of LEDs 124 receives the first limited current $i_1$ 115. The second set of LEDs 126 receives the first and second limited currents $i_1$ 115 and $i_2$ 117. The third set of LEDs 128 receives the first, second, and third limited currents $i_1$ 115, $i_2$ 117 and $i_3$ 119. The fourth set of LEDs receives the first $i_1$ 115, the second $i_2$ 117, the third $i_3$ 119, and the fourth limited currents $i_4$ 615. The fifth set of LEDs 632 receives the first $i_1$ 115, the second $i_2$ 117, the third $i_3$ 119, the fourth limited currents $i_4$ 414, and the fifth limited $i_5$ 615 currents. As shown, the first, second third, fourth, and fifth sets of LEDs 124, 126, 128, 420, and 632 are operating at approximately 100% of maximum power.

Although the invention has been discussed with reference to specific embodiments, it is apparent and should be understood that the concept can be otherwise embodied to achieve the advantages discussed. The preferred embodiments above have been described primarily as multi-stage LED drivers and lighting systems. In this regard, the foregoing description of the LED drivers and systems are presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:
1. An LED lighting system comprising:
   a bridge rectifier directly coupled to an AC line power source and providing a rectified signal, the AC line power source having a power cycle;
   a string of LEDs comprising a first, second, and third set of LEDs, the cathodes of the first set of LEDs directly, electrically connected to the anodes of the second set of LEDs, the cathodes of the second set of LEDs directly, electrically connected to the anodes of the third set of LEDs, the cathodes of the third set of LEDs connected to the bridge rectifier;

a first current limiting device coupled directly to the bridge rectifier receiving the rectified signal from the bridge rectifier, the first current limiting device coupled directly to the anode of the first set of LEDs and configured to provide a first limited current to the first, second, and third set of LEDs during a first portion of the power cycle;

a second current limiting device coupled directly to the bridge rectifier receiving the rectified signal from the bridge rectifier, the second current limiting device coupled directly to the anode of the second set of LEDs and configured to provide a second limited current to the second and third set of LEDs during a second portion of the power cycle; and, a third current limiting device coupled directly to the bridge rectifier receiving the rectified signal from the bridge rectifier, the third current limiting device coupled directly to the anode of the third set of LEDs and configured to provide a third limited current to the third set of LEDs during a third portion of the power cycle.

2. The LED lighting system of claim 1, wherein:
during the first portion of the power cycle, the first set of LEDs receives the first limited current, the second set of LEDs receives the first and second limited currents, and the third set of LEDs receives the first, the second, and the third limited currents;
during the second portion of the power cycle, the second set of LEDs receives the second limited current, and the third set of LEDs receives the second and the third limited currents; and,
during the third portion of the power cycle, the third set of LEDs receives the third limited current.

3. The LED lighting system of claim 2, wherein the Total Harmonic Distortion of Current (THDi) for the LED lighting system is less than 20%.

4. The LED lighting system of claim 1, wherein:
the first set of LEDs comprises two LEDs connected in parallel,
the second set of LEDs comprises four LEDs connected in parallel, and,
the third set of LEDs comprises five LEDs connected in parallel.

5. The LED lighting system of claim 1, wherein:
the first, the second, and the third current limiting devices are connected directly to the bridge rectifier without intermediate switches, and,
the first, the second, and the third current limiting devices are connected directly to the first, the second, and third sets of LEDs respectively without intermediate switches.

6. The LED lighting system of claim 1, wherein the first, the second, and the third current limiting devices provide the first, the second, and the third limited currents based on the instantaneous voltage of the AC line power source.

7. The LED lighting system of claim 1, wherein the AC line power source is a 120 volt AC power source.

8. The LED lighting system of claim 1, wherein the AC line power source is a 240 volt AC power source.

9. An LED lighting system comprising:
a bridge rectifier directly coupled to an AC line power source and providing a rectified signal, the AC line power source having a power cycle;
a string of LEDs comprising a first, second, third, and fourth set of LEDs, the cathodes of the first set of LEDs directly, electrically connected to the anodes of the second set of LEDs, the cathodes of the second set of LEDs directly, electrically connected to the anodes of the third set of LEDs, the cathodes of the third set of LEDs directly, electrically connected to the anodes of the fourth set of LEDs, the cathodes of the fourth set of LEDs connected to the bridge rectifier;

a first current limiting device coupled directly to the bridge rectifier receiving the rectified signal from the bridge rectifier, the first current limiting device coupled directly to the anode of the first set of LEDs and configured to provide a first limited current to the first, second, third, and fourth set of LEDs during a first portion of the power cycle;

a second current limiting device coupled directly to the bridge rectifier receiving the rectified signal from the bridge rectifier, the second current limiting device coupled directly to the anode of tile second set of LEDs and configured to provide a second limited current to the second, third, and fourth set of LEDs during a second portion of the power cycle; and, a third current limiting device coupled directly to the bridge rectifier receiving the rectified signal from the bridge rectifier, the third current limiting device coupled directly to the anode of the third set of LEDs and configured to provide a third and fourth limited current to the third set of LEDs during a third portion of the power cycle;

a fourth current limiting device coupled directly to the bridge rectifier receiving the rectified signal from the bridge rectifier, the fourth current limiting device coupled directly to the anode of the fourth set of LEDs and configured to provide a fourth limited current to the fourth set of LEDs during a fourth portion of the power cycle.

10. The LED lighting system of claim 9, wherein:
during the first portion of the power cycle, the first set of LEDs receives the first limited current, the second set of LEDs receives the first and second limited currents, the third set of LEDs receives the first, the second, and the third limited currents, and the fourth set of LEDs receives the first, the second, the third, and the fourth limited currents;
during the second portion of the power cycle, the second set of LEDs receives the second limited current, the third set of LEDs receives the second and the third limited currents, the fourth set of LEDs receives the second, the third, and the fourth limited currents;
during the third portion of the power cycle, the third set of LEDs receives the third limited current, the fourth set of LEDs receives the third and tile fourth limited currents; and,
during the fourth portion of the power cycle, the fourth set of LEDs receives the fourth limited current.

11. The LED lighting system of claim 9, wherein:
the first set of LEDs comprises two LEDs connected in parallel,
the second set of LEDs comprises four LEDs connected in parallel,
the third set of LEDs comprises five LEDs connected in parallel, and
the fourth set of LEDs comprises six LEDs connected in parallel.

12. The LED lighting system of claim 9, wherein:
the first, the second, the third current, and the fourth limiting devices are connected directly to the bridge rectifier without intermediate switches, and,
the first, the second, the third, and the fourth current limiting devices are connected directly to the first, the second, the third, and the fourth sets of LEDs respectively without intermediate switches.

13. The LED lighting system of claim 9, wherein the first, the second, the third, and the fourth current limiting devices provide the first, the second, the third, and the fourth limited currents based on the instantaneous voltage of the AC line power source.

14. The LED lighting system of claim 9, wherein the AC line power source is a 120 volt AC power source.

15. The LED lighting system of claim 9, wherein the AC line power source is a 240 volt AC power source.

16. The LED lighting system of claim 9, further comprising:
   a fifth set of LEDs, the cathodes of the fourth set of LEDs connected to the anodes of the fifth set of LEDs, the cathodes of the fifth set of LEDs connected to the bridge rectifier;
   a fifth current limiting device coupled directly to the bridge rectifier receiving the rectified signal from the bridge rectifier, the fifth current limiting device coupled directly to the anode of the fifth set of LEDs and configured to provide a fifth limited current to the fifth set of LEDs during a fifth portion of the power cycle.

17. An LED lighting system comprising:
   a power source providing a current and having an output voltage;
   a first stage comprising a first current limiting device and a first set of LEDs, the first current limiting device coupled directly to the power source, the first current limiting device coupled directly to the anode of the first set of LEDs;
   a second stage comprising a second current limiting device and a second set of LEDs, the second current limiting device coupled directly to the power source, the second current limiting device coupled directly to the anode of the second set of LEDs;
   wherein the cathodes of the first set of LEDs are directly, electrically connected to the anodes of the second set of LEDs.

18. The LED lighting system of claim 17, further comprising:
   additional stages comprising additional current limiting devices and corresponding additional sets of LEDs, each of the additional current limiting devices coupled to the anodes of the corresponding set of LEDs, said each of the additional current limiting devices coupled directly to the power source.

19. The LED lighting system of claim 17, wherein:
   the first and second current limiting devices are connected directly to the power source without switches, and,
   the first and second current limited devices are connected directly to the first and second sets of LEDs without switches.

20. The LED lighting system of claim 17, wherein the first and second current limiting devices provide the first and second limited currents based on the instantaneous voltage of the AC line power source.

* * * * *